US012772056B2

(12) United States Patent
Cohen et al.

(10) Patent No.: US 12,772,056 B2
(45) Date of Patent: Oct. 20, 2026

(54) REMOTE JOB EXECUTION VIA A SHARED SERVICE RUNNER

(71) Applicant: PagerDuty, Inc., San Francisco, CA (US)

(72) Inventors: Jake William Cohen, Santa Barbara, CA (US); Gregory West Schueler, Portland, OR (US)

(73) Assignee: PagerDuty, Inc., San Francisco, CA (US)

( * ) Notice: Subject to any disclaimer, the term of this patent is extended or adjusted under 35 U.S.C. 154(b) by 250 days.

(21) Appl. No.: 18/428,073

(22) Filed: Jan. 31, 2024

(65) Prior Publication Data

US 2025/0247699 A1 Jul. 31, 2025

(51) Int. Cl.
*H04W 12/06* (2021.01)
*H04W 12/062* (2021.01)
*H04W 12/08* (2021.01)
*H04W 24/04* (2009.01)

(52) U.S. Cl.
CPC ......... *H04W 12/062* (2021.01); *H04W 12/08* (2013.01); *H04W 24/04* (2013.01)

(58) Field of Classification Search
CPC .................................................. H04W 12/062
See application file for complete search history.

(56) References Cited

U.S. PATENT DOCUMENTS 9,948,612 B1 * 4/2018 Jawahar .............. H04L 63/0272
10,305,914 B1 5/2019 Brin et al.
2007/0180449 A1 8/2007 Croft et al.
2012/0311659 A1 * 12/2012 Narain .................. H04W 12/37 726/1
2014/0007048 A1 * 1/2014 Qureshi ................ H04L 9/0891 717/110
2014/0109178 A1 * 4/2014 Barton .................. G06F 21/604 726/1
2022/0029820 A1 1/2022 Mozano et al.
2023/0140918 A1 5/2023 Saxena et al.
2025/0247699 A1 * 7/2025 Cohen ................... H04W 12/08

OTHER PUBLICATIONS

Servicenow Documentation, "External credential storage", Aug. 2, 2023, retrieved from https://docs.servicenow.com/ bundle/vancouver-platform-security/page/product/credentials/concept/c_ ExternalCredentialStorage.html, 2 pages.

* cited by examiner

*Primary Examiner* — Ponnoreay Pich
(74) *Attorney, Agent, or Firm* — Young Basile Hanlon & MacFarlane, P.C.

(57) ABSTRACT

A service runner is deployed to a utility node within an infrastructure. The service runner is created in an event management bus (EMB) within a first workspace that includes a first automation task. The utility node is configured to communicate with the EMB. A second workspace is granted access to the service runner. The second workspace includes a second automation task and the access enables execution of the second automation task. A request associated with a workspace to execute an automation task on a target node is received. In responsive to a first determination that includes that the automation task and the workspace are the first automation task and the first workspace or a second determination that includes that the automation task and the workspace are the second automation task and the second workspace, the service runner is configured to execute the automation task.

20 Claims, 7 Drawing Sheets

REMOTE JOB EXECUTION VIA A SHARED SERVICE RUNNER

TECHNICAL FIELD

This disclosure relates generally to computer operations and more particularly, but not exclusively, to remotely executing automation tasks using a shared service runner.

SUMMARY

A first aspect of the disclosed implementations is a method that includes deploying a service runner to a utility node within an infrastructure, where the service runner is created in an event management bus (EMB) within a first workspace that includes a first automation task, and the utility node is configured to communicate with the EMB; granting, a second workspace, access to the service runner, where the second workspace includes a second automation task, and the access enables execution of the second automation task by the service runner; receiving a request associated with a workspace to execute an automation task on a target node; and configuring the service runner to execute the automation task responsive to a first determination that includes that the automation task is the first automation task and that the workspace is the first workspace or a second determination that includes that the automation task is the second automation task and that the workspace is the second workspace.

A second aspect of the disclosed implementations is a system that includes an event management bus (EMB) and a service runner that is deployed to a utility node of an infrastructure. The EMB is configured to execute instructions to associate a first automation task with a first workspace; associate a second automation task with a second workspace; associate a service runner with the first workspace; and grant, to the second workspace, access to the service runner, where the access enables execution of the second automation task by the service runner. The service runner is configured to execute instructions to obtain a request associated with a workspace to execute an automation task on a target node; and execute the automation task responsive to a first determination that includes that the automation task is the first automation task and that the workspace is the first workspace or a second determination that includes that the automation task is the second automation task and that the workspace is the second workspace.

A third aspect of the disclosed implementations is one or more non-transitory computer readable media that store instructions operable to cause one or more processors to perform operations that include deploying a service runner to a utility node within an infrastructure, where the service runner is created in an event management bus (EMB) within a first workspace that includes a first automation task and the utility node is configured to communicate with the EMB; granting, a second workspace, access to the service runner, where the second workspace includes a second automation task and the access enables execution of the second automation task by the service runner; receiving a request associated with a workspace to execute an automation task on a target node; and configuring the service runner to execute the automation task responsive to a first determination that includes that the automation task is the first automation task and that the workspace is the first workspace or a second determination that includes that the automation task is the second automation task and that the workspace is the second workspace.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
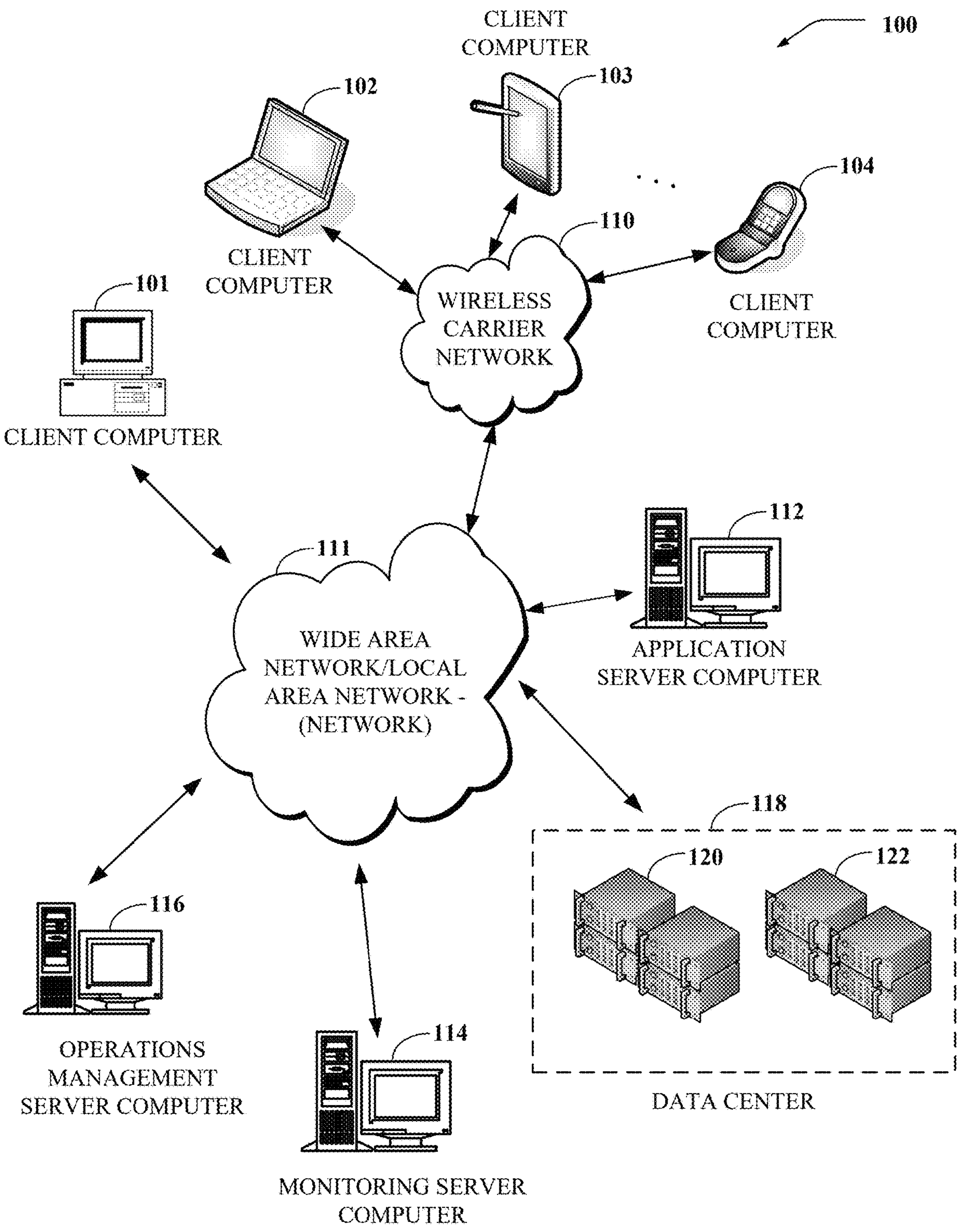
FIG. 1 shows components of one embodiment of a computing environment for event management.

An event management bus (EMB) is a computer system that may be arranged to monitor, manage, or compare the operations of one or more organizations. The EMB may be configured to accept various events that indicate conditions occurring in the one or more organizations. The EMB may be configured to manage several separate organizations at the same time. Briefly, an event can simply be an indication of a state of change to an information technology service of an organization. An event can be or describe a fact at a moment in time that may consist of a single or a group of correlated conditions that have been monitored and classified into an actionable state. As such, a monitoring tool of an organization may detect a condition in the IT environment (e.g., such as the computing devices, network devices, software applications, etc.) of the organization and transmit a corresponding event to the EMB. Depending on the level of impact (e.g., degradation of a service), if any, to one or more constituents of a managed organization, an event may trigger (e.g., may be, may be classified as, may be converted into) an incident. As such, an incident may be an unplanned disruption or degradation of service.

Non-limiting examples of events may include that a monitored operating system process is not running, that a virtual machine is restarting, that disk space on a certain device is low, that processor utilization on a certain device is higher than a threshold, that a shopping cart service of an e-commerce site is unavailable, that a digital certificate has or is expiring, that a certain web server is returning a 503 error code (indicating that web server is not ready to handle requests), that a customer relationship management (CRM) system is down (e.g., unavailable) such as because it is not responding to ping requests, and so on.

At a high level, an event may be received at an ingestion software of the EMB, accepted by the ingestion software, queued for processing, and then processed. Processing an event can include triggering (e.g., creating, generating, instantiating, etc.) a corresponding alert and a corresponding incident in the EMB, sending a notification of the incident to a responder (i.e., a person, a group of persons, etc.), and/or triggering a response (e.g., a resolution) to the incident. An alert (an alert object) may be created (instantiated) for anything that requires the performance (by a human or an automated task) of an action. Thus, the alert may embody or include the action to be performed.

An incident associated with an alert may or may not be used to notify the responder who can acknowledge (e.g., assume responsibility for resolving) and resolve the incident. An acknowledged incident is an incident that is being worked on but is not yet resolved. The user that acknowledges an incident may be said to claim ownership of the incident, which may halt any established escalation processes. As such, notifications provide a way for responders to acknowledge that they are working on an incident or that the incident has been resolved. The responder may indicate that the responder resolved the incident using an interface (e.g., a graphical user interface) of the EMB.

When responding to an incident, a user (i.e., a responder) may document the steps taken during the response that led to a resolution. Additionally, the user may want to automate those steps so that future responses to the same or similar incident types can be handled via automation (i.e., a job). The steps may be grouped together and executed in a predefined order as a job. A job may be defined by a job definition. A job definition may detail each command to be executed and the order in which to execute the commands. As such, a job definition includes an ordered set of steps (i.e., automation tasks).

An automation task associated with a job definition may specify a target node (e.g., host, server, endpoint, etc.) where at least a portion (e.g., some steps) of the automation task is to be executed (e.g., performed), such as by a processor or processors of the target node. A target node may be located within an infrastructure (e.g., a datacenter, a cloud environment, an IT infrastructure, and the like). To execute an automation task according to a job definition, the EMB may connect to multiple target nodes using various protocols (e.g., secure shell host (SSH), Windows Remote Management protocol (WinRM), application programming interface (API), script, etc.) to execute commands described in the job definition.

Connecting to a target node to execute at least some steps of an automation task may use a remote dispatch mechanism that uses a software program (i.e., a service runner). The service runner may be installed on a host (i.e., utility node, utility device) that is communicatively connected to the target node. In an example, the service runner may be located within the same infrastructure that includes the target node. The service runner may then execute commands on the target node using one or more remote communication protocols (e.g., SSH, WinRM, etc.). The service runner may also be configured to execute commands on the utility node itself. Said another way, the service runner may be configured to execute commands (e.g., tasks) locally.

To facilitate reuse, reduce resource consumption (such as those associated with storing redundant job definitions; deploying, maintaining, and operating multiple redundant service runners; and to reduce errors), job definitions may be grouped into workspaces (also referred to as projects) where a workspace may be associated with a group of users (e.g., a team, a department, a group of responders, etc.).

One group of users may require access (e.g., for the purpose of executing automation tasks) to a target node located within an infrastructure as (or otherwise communicatively connected to) a service runner associated with a workspace of another group of users. In a naïve approach, each group of users may configure their own service runner for executing automation tasks on the target node. This results in multiple service runners being used (e.g., deployed) within the same infrastructure (e.g., on the same utility node) therewith exhausting resources (e.g., compute or memory resources).

Additionally, having multiple service runners installed in an infrastructure (e.g., on the same node within the infrastructure) may increase the security risks. Specifically, the increased security risks can be attributed to the proliferation of attack vectors introduced by multiple service runners. Each service runner, being a separate entity, may have its own set of vulnerabilities and potential exploits. These vulnerabilities can include, but are not limited to, unpatched software, configuration errors, inadequate access controls, and susceptibility to common network attacks such as Denial of Service (DOS), Man-in-the-Middle (MitM), or SQL Injection. The coexistence of multiple service runners on the same utility node not only multiplies the number of potential entry points for unauthorized access but also complicates the security management, making it challenging to ensure that all service runners are equally secured and updated. Consequently, this situation could lead to a broader attack surface within the infrastructure, increasing the likelihood of successful cyber-attacks.

Implementations according to this disclosure solve problems such as those described above by enabling one workspace (equivalently, one group of users) to share (e.g., use) a service runner of another workspace (e.g., of another group of users). The workspace (e.g., users of the workspace) may not be enabled (e.g., configured to) modify the service runner.

Implementations according to this disclosure can reduce the number of resources consumed with an infrastructure. Additionally, for organizations that are concerned with security or that have strict requirements regarding how endpoints located within the infrastructure may be accessed, implementation according to this disclosure can alleviate those concerns and accommodate those restrictions.

In one implementation, a service runner is deployed to a utility node within an infrastructure. The service runner is created within a first workspace that includes a first automation task. The utility node can be configured to communicate with an EMB. A second workspace is granted access to the service runner. The second workspace includes a second automation task. The access enables execution of the second automation task by the service runner. A request associated with a workspace to execute an automation task on a target node is received. The service runner is configured to execute the automation task responsive to a first determination comprising that the automation task is the first automation task and that the workspace is the first workspace or a second determination comprising that the automation task is the second automation task and that the workspace is the second workspace.

There are numerous examples of remote job execution of automation tasks via a shared service runner outside the context of event and/or incident management. An automation job that is executable by a service runner as described herein may generally be used to automate many different aspects of business and/or technical operations where it is desirable to carry out the automation job in an infrastructure that may or may not be accessible from another infrastructure (such as one where an EMB may be executing or deployed).

The term "organization" or "managed organization" as used herein refers to a business, a company, an association, an enterprise, a confederation, or the like.

The term “event,” as used herein, can refer to one or more outcomes, conditions, or occurrences that may be detected (e.g., observed, identified, noticed, monitored, received, etc.) by an event management bus. An event management bus (which can also be referred to as an event ingestion and processing system) may be configured to monitor various types of events depending on the needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. An event (e.g., an event object) may be directly created (such as by a human) in the EMB via user interfaces of the EMB.

Events may be provided to the event management bus using one or more messages, emails, telephone calls, library function calls, application programming interface (API) calls, including, any signals provided to an event management bus indicating that an event has occurred. One or more third party and/or external systems may be configured to generate event messages that are provided to the event management bus.

The term “responder,” as used herein, can refer to a person or entity, represented or identified by persons, that may be responsible for responding to an event associated with a monitored application or service. A responder is responsible for responding to one or more notification events. For example, responders may be members of an information technology (IT) team providing support to employees of a company. Responders may be notified if an event or incident they are responsible for handling at that time is encountered. In some embodiments, a scheduler application may be arranged to associate one or more responders with times that they are responsible for handling particular events (e.g., times when they are on-call to maintain various IT services for a company). A responder that is determined to be responsible for handling a particular event may be referred to as a responsible responder. Responsible responders may be considered to be on-call and/or active during the period of time they are designated by the schedule to be available.

The term “incident” as used herein can refer to a condition or state in the managed networking environments that requires some form of resolution by a person or an automated service. Typically, incidents may be a failure or error that occurs in the operation of a managed network and/or computing environment. One or more events may be associated with one or more incidents. However, not all events are associated with incidents.

The term “incident response” as used herein can refer to the actions, resources, services, messages, notifications, alerts, events, or the like, related to resolving one or more incidents. Accordingly, services that may be impacted by a pending incident, may be added to the incident response associated with the incident. Likewise, resources responsible for supporting or maintaining the services may also be added to the incident response. Further, log entries, journal entries, notes, timelines, task lists, status information, or the like, may be part of an incident response.

The term “notification message,” “notification event,” or “notification” as used herein can refer to a communication provided by an incident management system to a message provider for delivery to one or more responsible resources or responders. A notification event may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term “team” or “group” as used herein refers to one or more responders that may be jointly responsible for maintaining or supporting one or more services or systems for an organization.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one embodiment of a computing environment 100 for event management. Not all the components may be required to practice various embodiments, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IoT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one embodiment, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, or the like, to display and send a message. In one embodiment, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. The wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. The network 111 can include any communication method by which information may travel between computing devices.

Additionally, communication media typically embodies computer-readable instructions, data structures, program modules, or other transport mechanisms and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
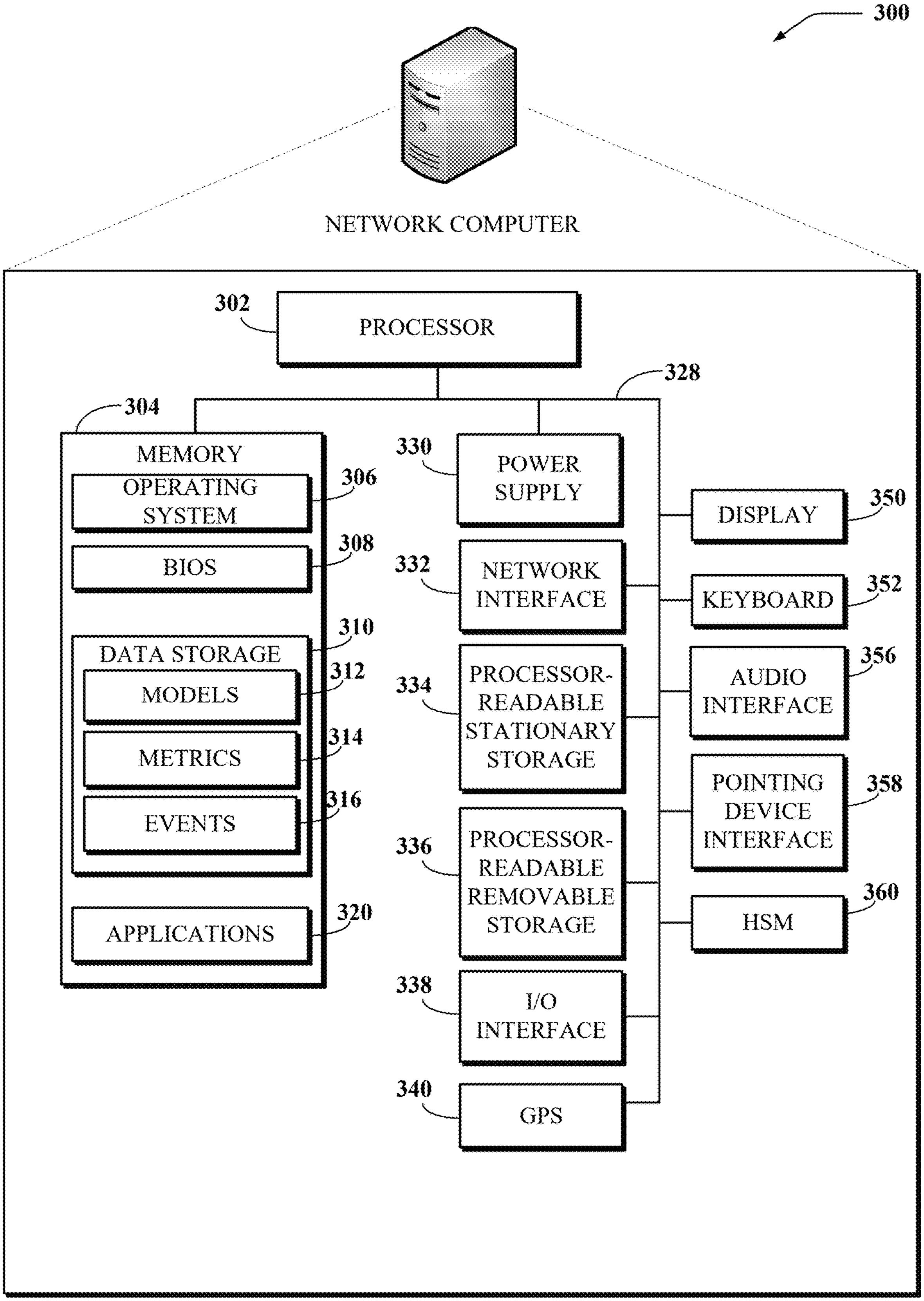
FIG. 3 shows one embodiment of a network computer that may at least partially implement one of the various embodiments.

The operations management server computer 116 may include virtually any network computer usable to provide computer operations management services, such as a network computer, as described with respect to FIG. 3. In one embodiment, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as, the monitoring server computer 114.

In at least one of the various embodiments, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some embodiments, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one embodiment, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some embodiments, one or more data centers, such as a data center 118, may be communicatively coupled to the wireless network 110 and/or the network 111. In at least one of the various embodiments, the data center 118 may be a portion of a private data center, public data center, public cloud environment, or private cloud environment. In some embodiments, the data center 118 may be a server room/data center that is physically under the control of an organization. The data center 118 may include one or more enclosures of network computers, such as, an enclosure 120 and an enclosure 122.

The enclosure 120 and the enclosure 122 may be enclosures (e.g., racks, cabinets, or the like) of network computers and/or blade servers in the data center 118. In some embodiments, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as, networks similar to and/or the including network 111 and/or wireless network 110. The data center 118 may enable and/or provide one or more cloud instances (not shown). The number and composition of cloud instances may vary depending on the demands of individual users, cloud network arrangement, operational loads, performance considerations, application needs, operational policy, or the like. In at least one of the various embodiments, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
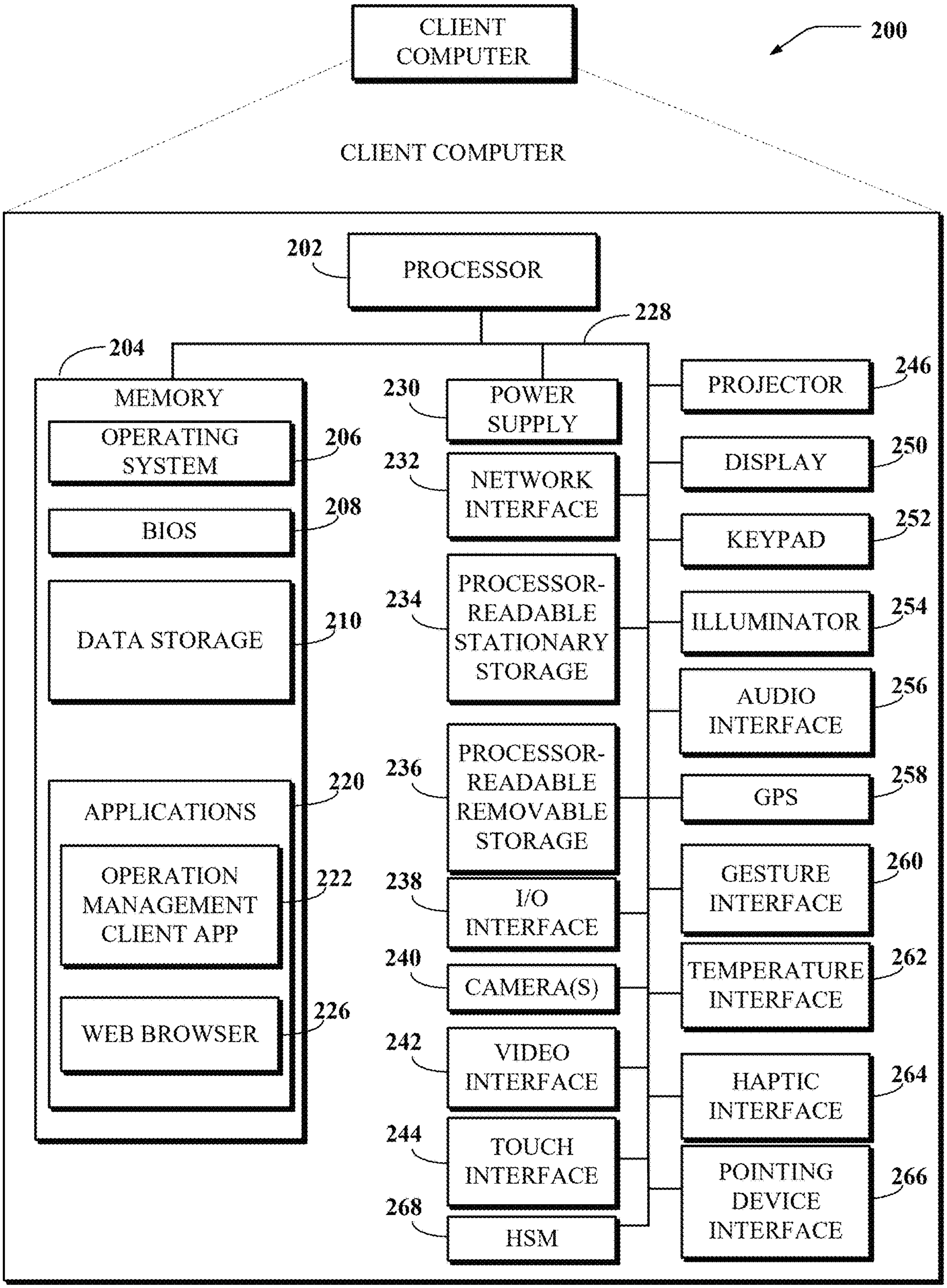
FIG. 2 shows one embodiment of a client computer.

FIG. 2 shows one embodiment of a client computer 200. The client computer 200 may include more or less components than those shown in FIG. 2. The client computer 200 may represent, for example, at least one embodiment of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver 258, an open-air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one embodiment, although not shown, a gyroscope may be employed within the client computer 200 to measure or maintain an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 268 may be a stand-alone computer, in other cases, the HSM 268 may be arranged as a hardware card that may be added to a client computer.

The I/O 238 can be used for communicating with external peripheral devices or other computers such as other client computers and network computers. The peripheral devices may include an audio headset, display screen glasses, remote speaker system, remote speaker and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open-air gesture interface 260 may sense physical gestures of a user of the client computer 200, for example, by using single or stereo video cameras, radar, a gyroscopic sensor inside a computer held or worn by the user, or the like.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one embodiment, however, the client computer 200 may, through other components, provide other information that may be employed to determine a physical location of the client computer, including for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one embodiment, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various embodiments, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer 200 may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one embodiment of network computer 300 that may at least partially implement one of the various embodiments. The network computer 300 may include more or less components than those shown in FIG. 3. The network computer 300 may represent, for example, one embodiment of at least one EMB, such as the operations management server computer 116 of FIG. 1, the monitoring server computer 114 of FIG. 1, or an application server computer 112 of FIG. 1. Further, in some embodiments, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one embodiment, however, the network computer 300 may, through other components, provide other information that may be employed to determine a physical location of the client computer, including for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or Apple Inc.'s IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one embodiment, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may be or include executable instructions, which can be loaded or copied, in whole or in part, from non-volatile memory to volatile memory to be executed by the processor 302. For example, the applications 320 can include instructions for performing some or all of the techniques of this disclosure. For example, the applications 320 can include software, tools, instructions or the like for defining workspaces, associating automation tasks (e.g., job definitions therefor) with the workspaces, associating service runners therewith, and configuring service runners to execute automation tasks. In at least one of the various embodiments, one or more of the applications may be implemented as modules or components of another application. Further, in at least one of the various embodiments, applications may be implemented as operating system extensions, modules, plugins, or the like.

Furthermore, in at least one of the various embodiments, at least some of the applications 320 may be operative in a cloud-based computing environment. In at least one of the various embodiments, these applications, and others, that include the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to at least some of the applications 320 may be provisioned and de-commissioned automatically.

In at least one of the various embodiments, the applications may be arranged to employ geo-location information to select one or more localization features, such as, time zones, languages, currencies, calendar formatting, or the like. Localization features may be used in user-interfaces as well as internal processes or databases. Further, in some embodiments, localization features may include information regarding culturally significant events or customs (e.g., local holidays, political events, or the like) In at least one of the various embodiments, geo-location information used for selecting localization information may be provided by the GPS transceiver 340. Also, in some embodiments, geolocation information may include information providing using one or more geolocation protocol over the networks, such as, the wireless network 108 or the network 111.

Also, in at least one of the various embodiments, at least some of the applications 320, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 360 may be a stand-alone network computer, in other cases, the HSM 360 may be arranged as a hardware card that may be installed in a network computer.

Additionally, in one or more embodiments (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
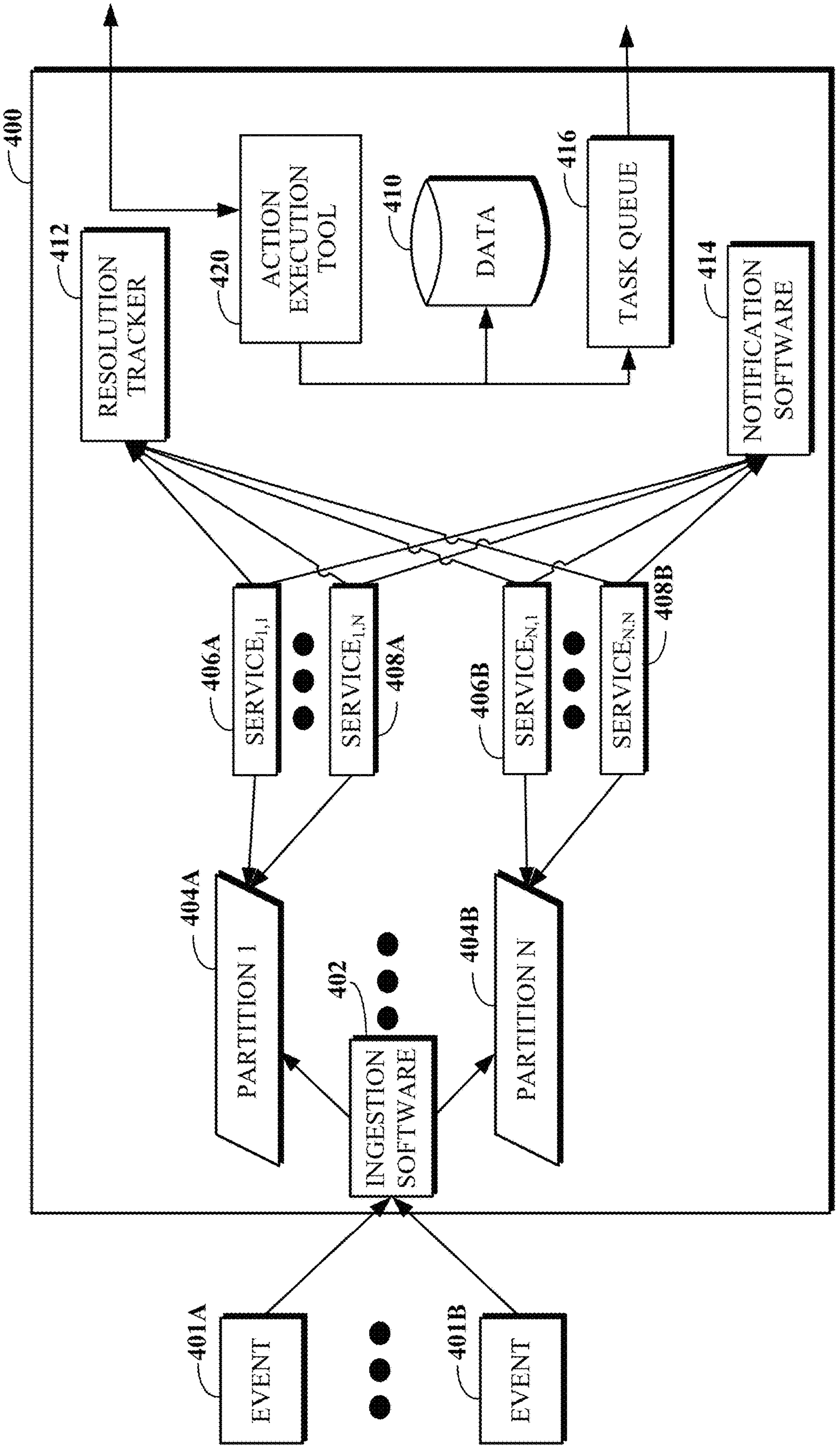
FIG. 4 illustrates a logical architecture of a system for remote job execution via a shared service runner.

FIG. 4 illustrates a logical architecture of a system 400 for remote job execution via a shared service runner for incident response automation.

In at least one of the various embodiments, a system for remote job execution via a shared service runner for incident response may include various components. In this example, the system 400 includes an ingestion software 402, one or more partitions 404A-404B, one or more services 406A-406B and 408A-408B, a data store 410, a resolution tracker 412, a notification software 414, a task queue 416, and an action execution tool 420.

One or more systems, such as monitoring systems, of one or more organizations may be configured to transmit events to the system 400 for processing. The system 400 may provide several services. A service may, for example, process an event and determine whether a downstream object (e.g., an incident) is to be triggered. As mentioned above, a received event may trigger an alert, which may trigger an incident, which in turn may cause notifications to be transmitted to responders.

A received event from an organization may include an indication of one or more services that are to operate on (e.g., process, etc.) the event. The indication of the service is referred to herein as a routing key. A routing key may be unique to a managed organization. As such, two events that are received from two different managed organizations for processing by the same service would include two different routing keys. A routing key may be unique to the service that is to receive and process an event. As such, two events associated with two different routing keys and received from the same managed organization for processing may be directed to (e.g., processed by) different services.

The ingestion software 402 may be configured to receive or obtain different types of events provided by various sources, here represented by events 401A, 401B. The ingestion software 402 may be configured to accept or reject received events. In an example, events may be rejected when events are received at a rate that is higher than a configured event-acceptance rate. If the ingestion software 402 accepts an event, the ingestion software 402 may place the event in a partition (such as one of the partitions 404A, 404B) for further processing. If an event is rejected, the event is not placed in a partition for further processing. The ingestion software may notify the sender of the event of whether the event was accepted or rejected. Grouping events into partitions can be used to enable parallel processing and/or scaling of the system 400 so that the system 400 can handle (e.g., process, etc.) more and more events and/or more and more organizations (e.g., additional events from additional organizations).

The ingestion software 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion software 402 may be arranged to normalize incoming events into a unified common event format. Accordingly, in some embodiments, the ingestion software 402 may be arranged to employ configuration information, including, rules, maps, dictionaries, or the like, or combination thereof, to normalize the fields and values of incoming events to the common event format. The ingestion software 402 may assign (e.g., associate, etc.) an ingested timestamp with an accepted event.

In at least one of the various embodiments, an event may be stored in a partition, such as one of the partition 404A or the partition 404B. A partition can be, or can be thought of, as a queue (e.g., a first-in-first-out queue) of events. FIG. 4 is shown as including two partitions (i.e., the partitions 404A and 404B). However, the disclosure is not so limited and the system 400 can include one or more than two partitions.

In an example, different services of the system 400 may be configured to operate on events of the different partitions. In an example, the same services (e.g., identical logic) may be configured to operate on the accepted events in different partitions. To illustrate, in FIG. 4, the services 406A and 408A process the events of the partition 404A, and the services 406B and 408B process the events of partition the 404B, where the service 406A and the service 406B execute the same logic (e.g., perform the same operations) of a first service but on different physical or virtual servers; and the service 408A and the service 408B execute the same logic of a second service but on different physical or virtual servers. In an example, different types of events may be routed to different partitions. As such, each of the services 406A-406B and 408A-408B may perform different logic as appropriate for the events processed by the service.

An (e.g., each) event may also be associated with one or more services that may be responsible for processing the events. As such, an event can be said to be addressed or targeted to the one or more services that are to process the event. As mentioned above, an event can include or can be associated with a routing key that indicates the one or more services that are to receive the event for processing.

Events may be variously formatted messages that reflect the occurrence of events or incidents that have occurred in the computing systems or infrastructures of one or more managed organizations. Such events may include facts regarding system errors, warning, failure reports, customer service requests, status messages, or the like. One or more external services, at least some of which may be monitoring services, may collect events and provide the events to the system 400. Events as described above may be comprised of, or transmitted to the system 400 via, SMS messages, HTTP requests/posts, API calls, log file entries, trouble tickets, emails, or the like. An event may include associated metadata, such as, a title (or subject), a source, a creation time stamp, a status indicator, a region, more information, fewer information, other information, or a combination thereof, that may be tracked. In an example, the event data may be received as structured data, which may be formatted using JavaScript Object Notation (JSON), XML, or some other structured format. The metadata associated with an event is not limited in any way. The metadata included in or associated with an event can be whatever the sender of the event deems required.

In at least one of the various embodiments, a data store 410 may be arranged to store performance metrics, configuration information, or the like, for the system 400. In an example, the data store 410 may be implemented as one or more relational database management systems, one or more object databases, one or more XML databases, one or more operating system files, one or more unstructured data databases, one or more synchronous or asynchronous event or data buses that may use stream processing, one or more other suitable non-transient storage mechanisms, or a combination thereof.

Data related to events, alerts, incidents, notifications, other types of objects, or a combination thereof may be stored in the data store 410. For example, the data store 410 can include data related to resolved and unresolved alerts. For example, the data store 410 can include data identifying whether alerts are or are not acknowledged. For example, with respect to a resolved alert, the data store 410 can include information regarding the resolving entity that resolved the alert (and/or, equivalently, the resolving entity of the event that triggered the alert), the duration that the alert was active until it was resolved, other information, or a combination thereof. The resolving entity can be a responder (e.g., a human). The resolving entity can be an integration (e.g., automated system), which can indicate that the alert was auto-resolved. That the alert is auto-resolved can mean that the system 400 received, such as from the integration, an event indicating that a previous event, which triggered the alert, is resolved. The integration may be a monitoring system.

The data store 410 can be used to store jobs and job definitions. The template data can be used to identify (e.g., select, choose, infer, determine, etc.) a template for a job or a job definition.

In at least one of the various embodiments, the resolution tracker 412 may be arranged to monitor the details regarding how events, alerts, incidents, other objects received, created, managed by the system 400, or a combination thereof are resolved. In some embodiments, this may include tracking incident and/or alert life-cycle metrics related to the events (e.g., creation time, acknowledgement time(s), resolution time, processing time), the resources that are/were responsible for resolving the events, the resources (e.g., the responder or the automated process) that resolved alerts, and so on. The resolution tracker 412 can receive data from the different services that process events, alerts, or incidents. Receiving data from a service by the resolution tracker 412 encompasses receiving data directly from the service and/or accessing (e.g., polling for, querying for, asynchronously being notified of, etc.) data generated (e.g., set, assigned, calculated by, stored, etc.) by the service. The resolution tracker can receive (e.g., query for, read, etc.) data from the data store 410. The resolution tracker can write (e.g., update, etc.) data in the data store 410.

While FIG. 4 is shown as including one resolution tracker 412, the disclosure herein is not so limited and the system 400 can include more than one resolution tracker. In an example, different resolution trackers may be configured to receive data from services of one or more partitions. In an example, each partition may be associated with one resolution tracker. Other configurations or mappings between partitions, services, and resolution trackers are possible.

The notification software 414 may be arranged to generate notification messages for at least some of the accepted events. The notification messages may be transmitted to responders (e.g., responsible users, teams) or automated systems. The notification software 414 may select a messaging provider that may be used to deliver a notification message to the responsible resource. The notification software 414 may determine which resource is responsible for handling the event message and may generate one or more notification messages and determine particular message providers to use to send the notification message.

In at least one of the various embodiments, a scheduler (not shown) may determine which responder is responsible for handling an incident based on at least an on-call schedule and/or the content of the incident. The notification software 414 may generate one or more notification messages and determine a particular message provider to use to send the notification message. Accordingly, the selected message providers may transmit (e.g., communicate, etc.) the notification message to the responder. Transmitting a notification to a responder, as used herein, and unless the context indicates otherwise, encompasses transmitting the notification to a team or a group. In some embodiments, the message providers may generate an acknowledgment message that may be provided to system 400 indicating a delivery status of the notification message (e.g., successful or failed delivery).

In at least one of the various embodiments, the notification software 414 may determine the message provider based on a variety of considerations, such as, geography, reliability, quality-of-service, user/customer preference, type of notification message (e.g., SMS or Push Notification, or the like), cost of delivery, or the like, or combination thereof. In at least one of the various embodiments, various performance characteristics of each message provider may be stored and/or associated with a corresponding provider performance profile. Provider performance profiles may be arranged to represent the various metrics that may be measured for a provider. Also, provider profiles may include preference values and/or weight values that may be configured rather than measured.

In at least one of the various embodiments, the task queue 416 may be arranged to maintain a list of tasks to be executed within an infrastructure. The task queue 416 may receive the task from the action execution tool 420. The task may be added to the task queue 416 may receive the task via an API. The task queue 416 may be queried for a list of tasks to be executed within an infrastructure via an API. The task queue 416 may have a task removed from the task queue 416 via an API, using a graphical user interface, or the like.

While the task queue 416 is named to include the term "queue" implying that it may be a data structure with certain semantics, no such limitations are intended. The task queue 416 can be implemented as a software program or executable instructions that stores data as a database, a linked list, a priority queue, an array, or any other suitable data structure capable of storing and managing automation tasks (or definitions therefor). The task queue 416 may be configured to prioritize certain tasks over others based on predefined criteria.

Additionally, the task queue 416 may support various operations such as task addition, deletion, updating, and querying. These operations can be performed via an API, which allows for programmatic interaction with the task queue 416. The API provides a set of defined endpoints and protocols for performing operations on the task queue 416, thereby facilitating automation and integration with other components of the system 400 and service runners, as further described herein.

The action execution tool 420 may receive actions selected by a responder. The action execution tool 420 may include facilities (e.g., tools, software, utilities, or the like) for transmitting the actions to, or causing the actions to be carried out by, IT components in the managed environments. For at least some of the actions, the IT components in the managed environments may return data (e.g., feedback data) to the action execution tool 420 indicating whether the actions were successful or other status data. That data is returned to the action execution tool 420 includes that the data are received by the resolution tracker 412, which stores the data in the data store 410, and those data used (e.g., retrieved) by the action execution tool 420 from the data store 410. The action execution tool 420 may store such status data in the data store 410. For example, the action execution tool 420 may store status data in association with corresponding actions and the alerts for which the actions were performed.

In at least one of the various embodiments, the system 400 may include various user-interfaces or configuration information (not shown) that enable organizations to establish how events should be resolved. Accordingly, an organization may define rules, conditions, priority levels, notification rules, escalation rules, routing keys, or the like, or combination thereof, that may be associated with different types of events. For example, some events (e.g., of the frequent type) may be informational rather than associated with a critical failure. Accordingly, an organization may establish different rules or other handling mechanics for the different types of events. For example, in some embodiments, critical events (e.g., rare or novel events) may require immediate (e.g., within the target lag time) notification of a response user to resolve the underlying cause of the event. In other cases, the events may simply be recorded for future analysis.

In an example, one or more of the user interfaces may be used to associate runbooks with certain types of objects. A runbook can include a set of actions that can implement or encapsulate a standard operating procedure for responding to (e.g., remediating, etc.) events of certain types. Runbooks can reduce toil. Toil can be defined as the manual or semi-manual performance of repetitive tasks. Toil can reduce the productivity of responders (e.g., operations engineers, developers, quality assurance engineers, business analysts, project managers, and the like) and prevents them from performing other value-adding work. In an example, a runbook may be associated with a template. As such, if an object matches the template, then the tasks of the runbook can be performed (e.g., executed, orchestrated, etc.) according to the order, rules, and/or workflow specified in the runbook. In another example, the runbook can be associated with a type. As such, if an object is identified as being of a certain type, then the tasks of the runbook associated with the certain type can be performed. A runbook can be assembled from predefined actions, custom actions, other types of actions, or a combination thereof.

In an example, one or more of the user interfaces may be used by responders to obtain information regarding objects and/or groups of objects. For example, a responder can use one of the user interfaces to obtain information regarding incidents assigned to or acknowledged by the responder. A user interface can be used to obtain information about an incident including the events (i.e., the group of events) associated with the incident. In an example, the responder can use the user interface to obtain information from the system 400 regarding the reason(s) a particular event was added to the group of events.

At least one of the services 406A-406B and 408A-408B may be configured to trigger alerts. A service can also trigger an incident from an alert, which in turn can cause notifications to be transmitted to one or more responders.

Figure 5:
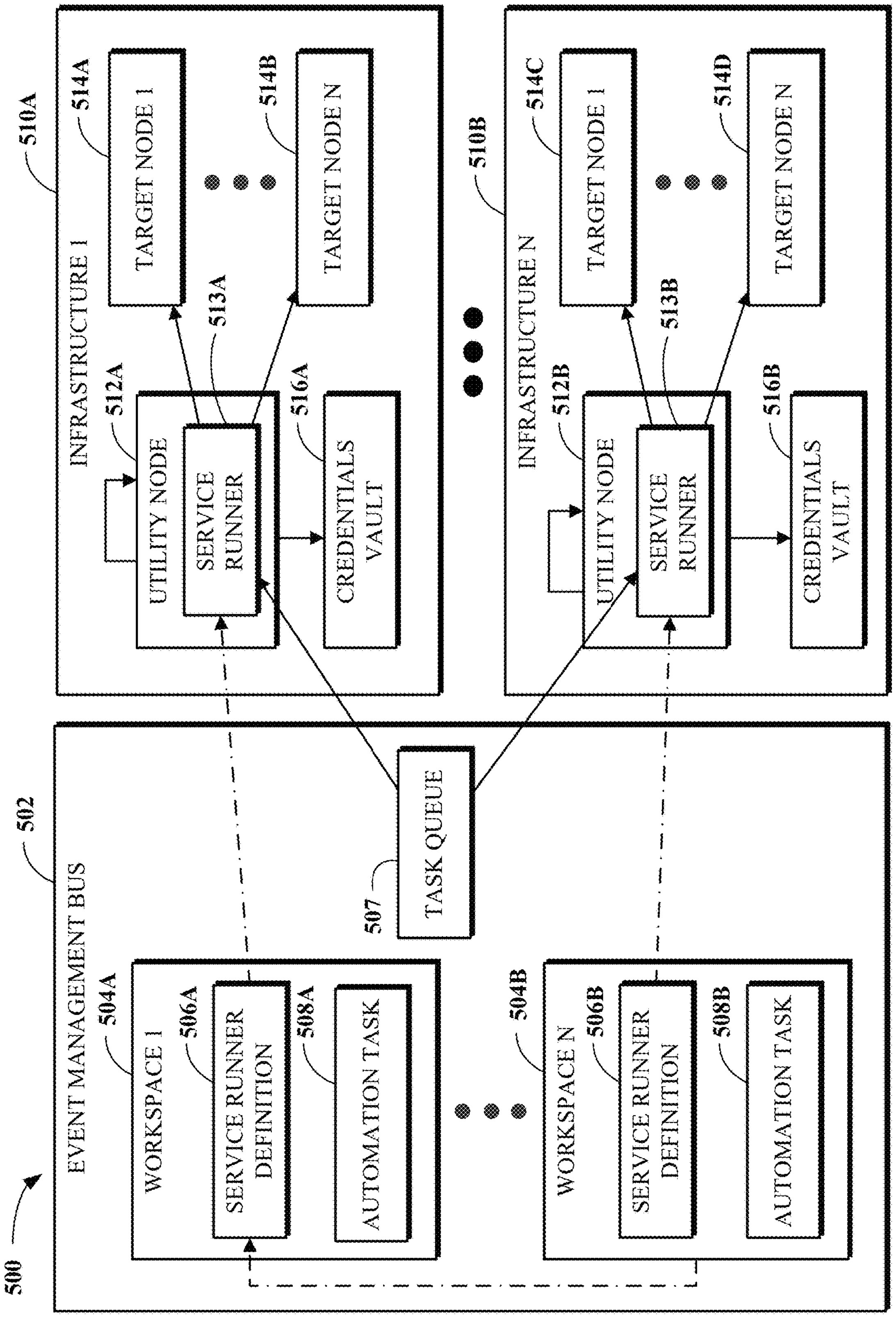
FIG. 5 is a block diagram of a system for remote job execution via a shared service runner.

FIG. 5 is a block diagram of a system 500 for remote job execution via a shared service runner. In at least one of the various embodiments, a system for remote job execution via a shared service runner may include various components. In this example, the system 500 includes an EMB 502, one or more workspaces 504A-504B (defined or created via the EMB 502), one or more service runner definitions 506A-506B, a task queue 507, one or more automation tasks 508A-508B, one or more infrastructures 510A-510B, one or more utility nodes 512A-514B, one or more service runners 513A-513B, one or more target nodes 514A-514D and one or more credential vaults 516A-516B. The EMB 502 may be the system 400 of FIG. 4. The EMB 502 may be utilized by one or more users (e.g., groups of users). The users may be organized into groups of users. A group of users may represent logical groupings of the users such as an organization, a department within the organization, a team within the department, or any other logical grouping. A group of users may be associated with a workspace within the EMB 502. A workspace may include or be associated with one or more automation tasks (such as the automation tasks 508A-508B). The automation tasks 508A-508B may be used to respond to an event. The automation tasks 508A-508B may be executed within an infrastructure, such as one of the infrastructures 510A-510B. The infrastructure may be a geographically disparate location from the EMB 502.

For example, the EMB 502 may be hosted within a datacenter chosen by a vendor or supplier of the organization (i.e., third party). As such the EMB 502 may be hosted within an Azure cloud environment whereas the organization may maintain its own private datacenter located within its own facilities. Alternatively, the organization may use Amazon Web Services (AWS) or another provider for hosting. In either case, the infrastructure of the organization may be located in a different geographic or physical location than that of the EMB 502.

The service runner definitions 506A-506B may be used to define and deploy a service runner to an infrastructure. The service runner definition 506A may be used to deploy the service runner 513A to the infrastructure 510A. The service runner definition 506B may be used to deploy the service runner 513B to the infrastructure 510B. The service runners 513A-513B, may be used as a bridge or a gateway between the EMB 502 and the infrastructure of the organization. The service runners 513A-513B may be a software program that may be deployed (i.e., installed, configured, setup) on a node (i.e., endpoint) within the infrastructure of the organization.

The service runner definitions 506A-506B may be created within the EMB 502 and associated with a workspace (such as the workspaces 504A-504B). Additionally, other workspaces (such as the workspace 504B) may be granted access to utilize the service runner 506A. The service runners 513A-513B may be deployed to a node within the infrastructure (such as the infrastructures 510A-510B). The node at which the service runners 513A-513B are installed is referred to herein as a utility node (such as the utility nodes 512A-512B). Once the service runners 513A-513B have been deployed to a utility node in the infrastructure, the service runners 513A-513B may be able to execute commands on other nodes within the infrastructure. The other nodes within the infrastructure may be referred to as target nodes (such as target nodes 514A-514D). Additionally, the service runners 513A-513B may be able to execute commands on the utility node as well, as such the utility node may be the target node.

For examples, the service runner 513A is associated with workspace 504A. The service runner 513A may also be shared with workspace 504B. That is, the workspace 504B may be granted access to use the service runner 513A. The service runner 513A is still associated with workspace 504A and may be deployed within the infrastructure 510A or infrastructure 510B as determined by the workspace 504A but the workspace 504B may also utilize the service runner 513A to execute commands on target nodes located with the same infrastructure in which the service runner 513A is deployed.

While not specifically shown in FIG. 5, the service runner 513A may be associated with a list of target nodes in the infrastructure 510A. Associating the service runner 513A with a target node can include associating the service runner 513A with an identifier of the target node. The identifier can be an IP address, a MAC address, a server name, or some other identifier. The service runner 513A can be configured to execute automation tasks (e.g., one or more steps therein) only on target nodes it is associated with. The list of target nodes may be associated with the workspace 504A. As such, the service runner 513A can be configured to execute automation tasks on target nodes associated with the workspace that the service runner 513A is created in.

Sharing the service runner 513A with another workspace can include that the service runner 513A can be additionally configured to execute automation tasks on at least some of the target nodes associated with the workspace to which the service runner 513A is shared.

The service runner 513A may be configured to periodically check the task queue 507 for tasks to be executed. The task queue 507 may be the task queue 416 of FIG. 4. The service runner 513A may check the task queue 507 (such as via an API call, a hypertext transfer protocol (HTTP) request, a hypertext transfer protocol secure (HTTPS) request, or any other suitable protocol) for task definitions describing tasks to be executed by the service runner 513A. By configuring the service runner 513A to periodically check the task queue 507 for automation tasks to be executed by the service runner 513A, the EMB 502 does not require access to the infrastructure 510A in which the service runner 513A is deployed. That is, the service runner 513A initiates the interaction with the task queue 507 and the task queue 507 may respond (i.e., transmit data) to the service runner 513A without requiring ports to be opened between the EMB 502 (where the task queue 507 is located) and the infrastructure (such as the infrastructure 510A) where the service runner 513A may be deployed.

The task queue 507 may transmit automation tasks (such as the automation tasks 508A-508B) or definitions thereof to the service runner 513A upon request. The automation tasks may be defined using a task definition. A task definition may include various properties of the automation task, including but not limited to, one or more of a target node such as one of the target nodes 514A-514D, a command to be executed on the target node, a protocol used to execute the command, or a credential identifier. As mentioned, the automation task may be associated with a workspace. As such when the service runner 513A initiates a request to the task queue 507 to obtain automation tasks, the request may be limited to only receive automation tasks associated with a given workspace or the request may be to receive any automation tasks to be executed by the service runner 513A.

The command to be executed on the target node may be an HTTP/HTTPS request, a SQL command, a script, or any other command that can be executed within the infrastructure. The protocol used to execute the command may refer to a particular mechanism of execution, such as using HTTP or HTTPS, using secure shell host (SSH), file transfer protocol (FTP), secure file transfer protocol (SFTP), Windows® remote management (WinRM), Structured Query language (SQL), or the like. The protocol may indicate the use of a plugin (e.g., an adapter) to execute the command. Additionally, or alternatively, a task definition may indicate the plugin to be used. To illustrate, and without limitations, a SQL plugin, which may incorporate a Java Database Connectivity (JDBC) library, may be available to facilitate command execution (e.g., queries) in a database.

A plugin can be a specialized software component designed to interface with a particular system (e.g., application or backend system). The primary function of a plugin is to facilitate communication and interaction between the service runner and a complex system without requiring the user of the plugin to understand the intricate details of these systems. For instance, in scenarios where commands such as HTTP/HTTPS requests, SQL commands, or scripts need to be executed on a target node within an infrastructure, a plugin serves an intermediary. By integrating with the underlying protocol—be it HTTP, HTTPS, SSH, FTP, SFTP, WinRM, SQL, or similar protocols—a plugin effectively translates user commands into a format that is comprehensible and executable by the target system.

A plugin may be constructed as a separate module, which can take various forms such as a dynamic link library (DLL), a java archive (JAR), or other suitable formats compatible for use in (e.g., callable from) the service runner 513A. This modular nature allows for flexibility and scalability in the system's architecture, as plugins can be added, removed, or updated independently without impacting the core functionality of the service runner 513A. A plugin encompasses a set of instructions specifically tailored to accomplish a particular operation or a set of operations. This design approach ensures that the plugins are focused and efficient in their tasks, thereby enhancing the overall performance and reliability of the system. The task definition within the system may indicate the specific plugin to be utilized, thereby providing a structured and organized framework for executing various commands within the infrastructure.

The plugin may be configured for use by the service runner 513A by the service runner definition 506A using an API or graphical user interface (GUI) of the EMB 502. The plugin may be selected from a list of plugins for use with the service runner 513A. The plugin may be a discrete module, separate from the service runner 513A such that the plugin may be used by another service runner (i.e., the service runner 513B). The plugin may be deployed with the service runner 513A, when the service runner 513A is deployed to the utility node 512A. Alternatively, the plugin may be deployed separately from the service runner 513A such that the plugin may be updated without having to update the service runner 513A.

In some embodiments all available plugins may be deployed with the service runner 513A. As such, when a new plugin is added to the list of plugins, the service runner 513A can be configured to execute commands using the new plugin. In an example, with respect to a plugin that has not been deployed with the service runner 513A (such as because it may be a new plugin that was added after the service runner was deployed or that its use was not foreseen), the service runner 513A may retrieve the plugin from the EMB 502 at runtime, when the plugin is required by the automation task. To illustrate, a task definition may indicate the use of a plugin, in response to the service runner 513A determining that the plugin is not available at the utility node 512A, the server runner 513A requests the plugin from the EMB 502. The service runner 513A can cause the plugin to be installed at the utility node 512A. The plugin (e.g., an installable package containing the plugin) received from the EMB 502 may be signed. The signature of the plugin may be used to validate the source of the plugin and prevent man-in-the-middle attacks.

In some embodiments, only the plugins defined within the service runner definition 513A may be deployed with the service runner 513A. The plugins in which the service runner 513A may use may be defined using an API or GUI of the EMB 502. A subset of plugins, selected from the list if plugins may be defined for use by the service runner 513A. As such, only the selected plugins may be deployed with and used by the service runner 513A.

Furthermore, different protocols may be used to execute the same command depending on the target node. To illustrate, an automation task associated with workspace 504A may define the SSH protocol to access one target node and an automation task associated with workspace 504B may define the WinRM protocol to access another target node. The target node may be the utility node, as such the service runner 513A may be able to execute the command on the same node in which the service runner 513A is deployed. Additionally, the task definition may include a credential indicator. The credential indicator may be one of a credential, a credential identifier, or none.

When the credential indicator is the credential itself, the service runner 513A may use the credential supplied to execute the command on the target node. For example, the task definition may include a command to execute an API request using HTTPS on the target node 514A. The API may require an access token for the command to be executed. The access token may be passed (e.g., transmitted to the service runner) within the credential indicator. As such, the service runner 513A may use the credential received within the task definition to execute the API request using HTTPS on the target node 514A.

The credential indicator may be a credential identifier. In this example, the task definition includes a command to execute an API request using HTTPS on the target node 514B. The API request may require an access token for the command to be executed. The task definition may include a credential identifier in the credential indicator. As such, the service runner 513A may use the credential identifier to retrieve the access token from the credential vault 516A. The credential vault 516A may provide the service runner 513A with the credential (i.e., access token) associated with the credential identifier. For example, in response to a request issued by the service runner 513A for the credential based on the credential identifier, the credential vault 516A provides the credential to the service runner 513A.

Using a credential identifier as the credential indicator instead of the credential itself may be desirable within some infrastructures in which a higher level of security is required. Using a credential identifier means that the credential does not have to exist or persist outside of the credential vault within the infrastructure. That is, the credential vault (such as the credential vault 516A) may be hosted securely within the infrastructure (such as the infrastructure 510A).

The only access to the credential vault that is allowed may come from within the infrastructure, that is utility nodes (such as utility node 512A) and target nodes (such as target nodes 514A-514B) can access the credentials vault. However, the EMB 502 does not need to be hosted or maintained within the infrastructure. As such, workspaces, automation tasks, and the like can be maintained outside of the infrastructure and the only knowledge of the credentials contained within the credentials vault is an identifier used to identify a particular credential within the credentials vault.

While not specifically shown in FIG. 5, the service runner 513A may be deployed to more than one utility node within the infrastructure 510A therewith supporting horizontal scalability for efficiently managing workload distribution. Horizontal scalability can be achieved by deploying multiple instances of the service runner 513A across various utility nodes within the infrastructure 510A. Each of the instances, while operating independently, retains the same functionality as the original service runner 513A, ensuring uniformity and consistency in performance. This deployment strategy allows the system to handle increasing workloads by adding more instances of the service runner 513A, rather than relying solely on upgrading the capabilities of a single node.

A unique and consistent identifier can be associated with all instances of the service runner 513A. This identifier can be useful in the coordinated functioning of the instances, such as in the context of task management. To illustrate, each instance, upon querying the task queue 507, is assigned an automation task for execution. Once an automation task is picked up by an instance of the service runner 513A, it is removed from the task queue 507 to prevent duplicate processing by another instance. This mechanism ensures that each task is executed exactly once.

Figure 6:
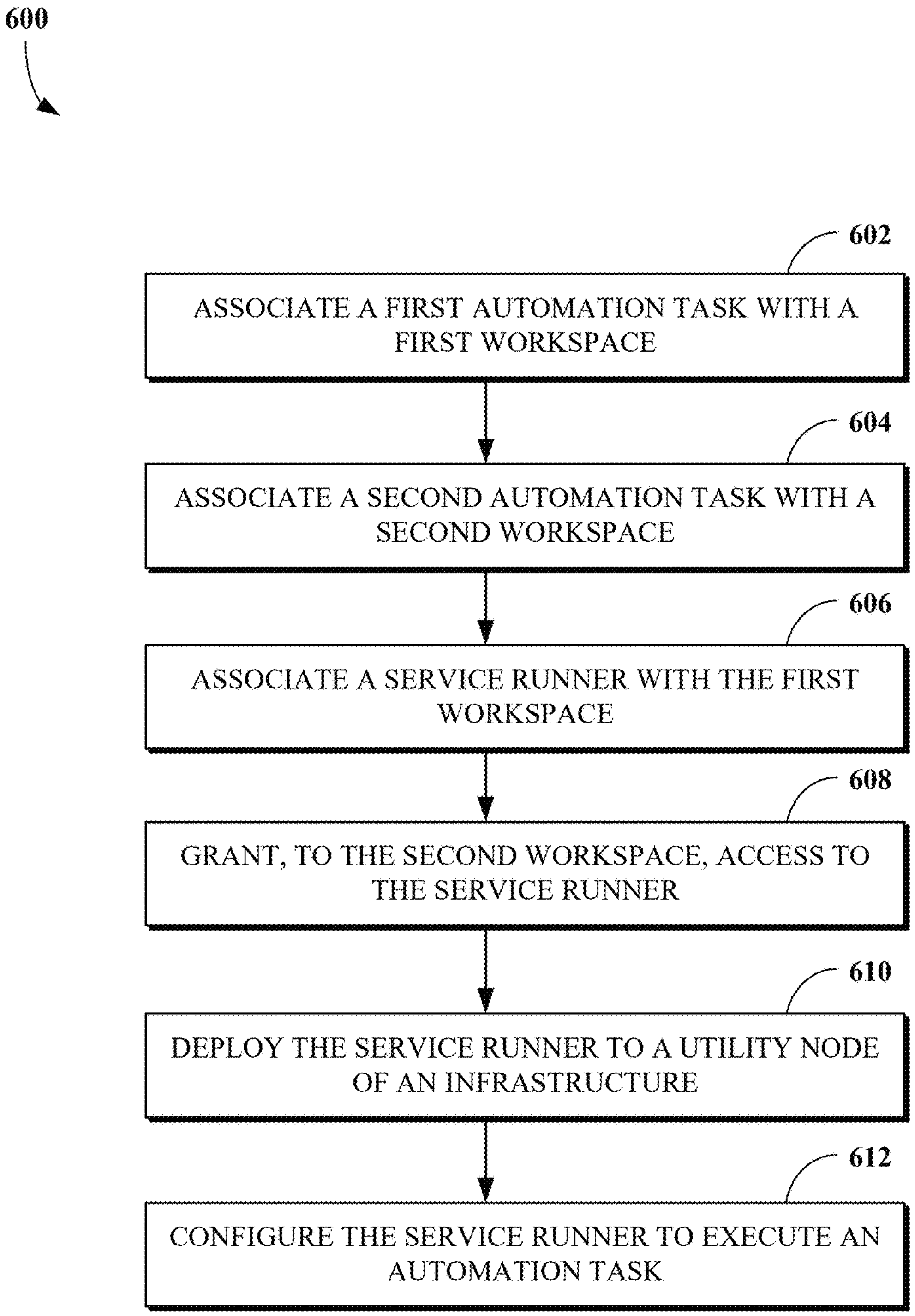
FIG. 6 is a flowchart of a technique for configuring a service runner within an event management bus (EMB).

FIG. 6 is a flowchart of a technique 600 for configuring a service runner within an EMB. The technique 600 includes operations 602 through 612, which are described below. The technique 600 can be stored in a memory (such as the memory 304, the processor readable stationary storage 334, the processor readable removeable storage 336 of FIG. 3, or any combination thereof) as instructions that can be executed by a processor (such as the processor 302 of FIG. 3) of a computer (such as the application server computer 112 of FIG. 1). In some implementations, some or all operations of the technique 600 may be performed on a client computer, such as by the client computer 101-104. In some other implementations, some or all operations of the technique 600 may be performed at the enclosure 120 or the enclosure 122, such as by the operations management server computer 116 at the data center 118.

At operation 602, the technique 600 associates a first automation task with a first workspace. The first automation task may be the automation task 508A and the first workspace may be the workspace 504A of FIG. 5. That is, the first automation task may be created within the first workspace using an API or a graphical user interface (GUI). The first automation task may be created by a user associated with the first workspace. For example, the first workspace may be used by the network operations (NetOps) team of an organization. The NetOps team may desire to automate some of the operations they perform on a daily basis or common operations in response to an incident. As such the NetOps team might create a first automation task within the first workspace.

At operation 604, the technique 600 associates a second automation task with a second workspace. The second automation task may be the automation task 508B and the second workspace may be the workspace 504B of FIG. 5. That is, the second automation task may be created within the second workspace using an API or GUI. The second automation task may be created by a user associated with the second workspace. For example, the second workspace may be used by the cloud operations (CloudOps) team of the organization. The CloudOps team may desire to automate some of the operations performed on a daily basis or operations in response to an incident. As such the CloudOps team may create a second automation task within the second workspace.

At operation 606, the technique 600, associates a service runner with the first workspace. The service runner may be the service runner 513A of FIG. 5. That is, the service runner may be created for use within the first workspace. At operation 608, the technique 600 grants, to the second workspace, access to the service runner. That is, the second workspace may be granted access to use the service runner in addition to the first workspace using the service runner. For example, the NetOps team may have created the service runner for executing automation tasks within an infrastructure (such as the infrastructure 510A of FIG. 5) that are critical to the responsibilities of the NetOps team. Additionally, the CloudOps team may desire to execute automation task within the same infrastructure as the NetOps team. As such, the NetOps team can grant the CloudOps team access to the service runner. This allows for both teams to access the same infrastructure without the need to deploy and maintain multiple service runners within the infrastructure. In some embodiments the second workspace may be granted access the service when the first workspace receives an access request for the service runner from the second workspace. The second workspace may, in return, receive a granting request from the first workspace. For example, a member of the CloudOps team may, using a GUI of the EMB (such as the EMB 502 of FIG. 5) discover that the NetOps team maintains a service runner within the infrastructure. As such the member of the CloudOps team may initiate a request, using the GUI of the EMB to request access to the service runner. A member of the NetOps team may, in turn, receive the access request via the GUI of the EMB and initiate a granting request to the CloudOps team.

In an example, the EMB may enable a user associated with a workspace to query (e.g., search) for and identify available service runners (e.g., service runners associated with other workspaces). The user may select a target node and query for service runners that can be configured to execute automation tasks on that target node. If such a service runner is identified, the user may initiate a request to grant the workspace access to the service runner.

At operation 610, the technique 600 may deploy (i.e., install or setup) the service runner to a utility node of an infrastructure. The utility node may be the utility node 512A and the infrastructure may be the infrastructure 510A of FIG. 5. At operation 612, the technique 600 may configure the service runner to execute an automation task. That is, the action execution tool 420 may add an automation task to the task queue 507 of FIG. 5. The service runner may query the task queue 507 in a periodic manner, requesting automation tasks to be executed by the service runner. The automation task may be the automation task 508A for FIG. 5.

For example, the first automation task (i.e., automation task 508A) associated with the first workspace (i.e., the workspace 504A) may be defined by a task definition in which the target node is the target node 514A of FIG. 5. The target node 514A is located within infrastructure 510A and the service runner is deployed within the infrastructure 510A. As such, the automation task may be identified for execution by the service runner. When the service runner queries the task queue 507 for automation tasks, the automation task will be sent to the service runner and the service runner may be configured based on the task definition of the automation task.

Figure 7:
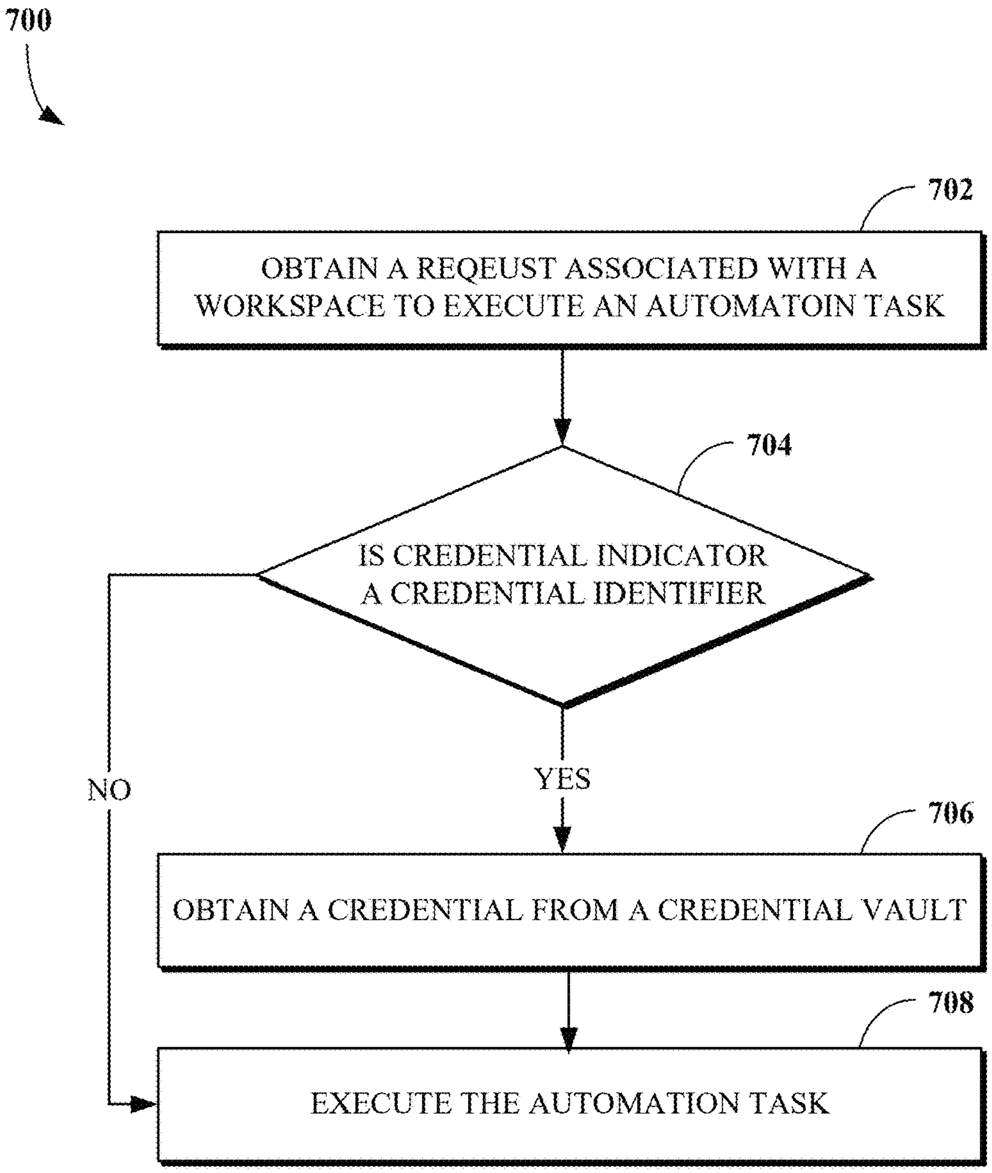
FIG. 7 is a flowchart of a technique for executing automation tasks using a service runner.

FIG. 7 is a flowchart of a technique 700 for executing automation tasks using a service runner. The technique 700 includes operations 702 through 708, which are described below. The technique 700 can be stored in a memory (such as the memory 304, the processor readable stationary storage 334, the processor readable removeable storage 336 of FIG. 3, or any combination thereof) as instructions that can be executed by a processor (such as the processor 302 of FIG. 3) of a computer (such as the application server computer 112 of FIG. 1). In some implementations, some or all operations of the technique 700 may be performed on a client computer, such as by the client computer 101-104. In some other implementations, some or all operations of the technique 700 may be performed at the enclosure 120 or the enclosure 122, such as by the operations management server computer 116 at the data center 118.

At operation 702, the technique 700 obtains a request associated with a workspace to execute an automation task. That is, the service runner (such as the service runner 513A or the service runner 513B of FIG. 5) may query the task queue 507 of FIG. 5 for automation tasks to be executed by the service runner. At operation 704, the technique 700 checks the credential indicator included in the task definition of the automation task to determine whether the credential indicator is a credential identifier. If the credential indicator is a credential identifier, then the technique 700 continues to operation 706, otherwise, the technique 700 continues to operation 708.

At operation 706, the technique 700 obtains a credential from a credential vault. That is, the service runner uses the credential identifier included within the task definition of the request a credential from a credential vault (e.g., password manager, key store, key vault, etc.) The credential vault may be the credential vault 516A of FIG. 5. The service runner may request the credential using an API request or an HTTP(S) request, or any other suitable request. The credential vault may return a credential to the service runner wherein the credential is identified using the credential identifier. For example, the task definition may include a command to query a database using SQL. Furthermore, the task definition may include a credential identifier of "SQL Database Production." The service runner may using the credential identifier to request a credential from the credential vault associated with the credential identifier "SQL Database Production." If the credential vault includes a credential, identified as such, the credential vault may return the credential associated with the given identifier. If the credential vault does not have a credential identified by the credential identifier, the credential vault may return nothing (i.e., NULL).

At operation 708, the technique 700 executes the automation task. That is the service runner executes the command included within the task definition on the target node specified, using the protocol specified and the credential indicated by the credential indicator. For example, the technique 700 may receive the automation task defined by the task definition that targets the target node 514B, the command "SELECT*FROM Products" using the SSH protocol and the credential identifier "SQL Database Production." As such the service runner may locate the target node 514A, connect to the target node using the SSH protocol and execute the SQL command "SELECT*FROM Products" using the credential. The credential may be a username and password combination that was supplied within the task definition or obtained from the credential vault.

For simplicity of explanation, the techniques 600 and 700 of FIGS. 6 and 7 are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "software" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, and/or the like. A software may be compiled into executable programs or written in interpreted programming languages. Software may be callable from other software or from themselves. Software described herein refer to one or more logical modules that can be merged with other software or applications, or can be divided into sub-software or tools. The software can be stored in non-transitory computer-readable medium or computer storage devices and be stored on and executed by one or more general purpose computers, thus creating a special purpose computer configured to provide the software.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

deploying a service runner to a utility node within an infrastructure, wherein the service runner is created in an event management bus (EMB) within a first workspace that includes a first automation task, wherein the utility node is configured to communicate with the EMB;

granting, a second workspace, access to the service runner, wherein the second workspace includes a second automation task, and wherein the access enables execution of the second automation task by the service runner;

receiving a request associated with a workspace to execute an automation task on a target node; and configuring the service runner to execute the automation task responsive to a first determination comprising that the automation task is the first automation task and that the workspace is the first workspace or a second determination comprising that the automation task is the second automation task and that the workspace is the second workspace.

2. The method of claim 1, wherein receiving the request associated with the workspace includes receiving a task definition comprising:

the target node;

a command to execute on the target node;

a protocol associated with the command; and a credential indicator, wherein the credential indicator is one of, a credential, a credential identifier, or none.

3. The method of claim 2, wherein the service runner obtains a credential for executing the automation task from a credential vault deployed within the infrastructure based on a credential identifier.

4. The method of claim 2, wherein configuring the service runner to execute the automation task comprises:

adding the task definition associated with the automation task to a task queue, wherein the service runner periodically queries the task queue.

5. The method of claim 2, wherein the task definition identifies the utility node as the target node and the service runner executes the command on the utility node.

6. The method of claim 2, wherein the task definition is a first task definition when the task definition is associated with the first automation task and a second task definition when the task definition is associated with the second automation task, wherein the first task definition includes the target node and the second task definition includes the target node; and wherein the first task definition includes a first protocol that is different from a second protocol included in the second task definition.

7. The method of claim 1, wherein granting a second workspace access to the service runner comprises:

receiving an access request to the service runner associated with the second workspace; and receiving, in response to the access request, a granting request, wherein the second workspace is granted access to the service runner in response to the granting request.

8. One or more non-transitory computer readable media storing instructions operable to cause one or more processors to perform operations comprising:

deploying a service runner to a utility node within an infrastructure, wherein the service runner is created in an event management bus (EMB) within a first workspace that includes a first automation task, wherein the utility node is configured to communicate with the EMB;

granting, a second workspace, access to the service runner, wherein the second workspace includes a second automation task, and wherein the access enables execution of the second automation task by the service runner;

receiving a request associated with a workspace to execute an automation task on a target node; and configuring the service runner to execute the automation task responsive to a first determination comprising that the automation task is the first automation task and that the workspace is the first workspace or a second determination comprising that the automation task is the second automation task and that the workspace is the second workspace.

9. The one or more non-transitory computer readable media of claim 8, wherein receiving the request associated with the workspace includes receiving a task definition comprising:

the target node;

a command to execute on the target node;

a protocol associated with the command; and a credential indicator, wherein the credential indicator is one of, a credential, a credential identifier, or none.

10. The one or more non-transitory computer readable media of claim 9, wherein the service runner obtains a credential for executing the automation task from a credential vault deployed within the infrastructure based on a credential identifier.

11. The one or more non-transitory computer readable media of claim 9, wherein the task definition identifies the utility node as the target node and the service runner executes the command on the utility node.

12. The one or more non-transitory computer readable media of claim 9, wherein the task definition is a first task definition when the task definition is associated with the first automation task and a second task definition when the task definition is associated with the second automation task, wherein the first task definition includes the target node and the second task definition includes the target node; and wherein the first task definition includes a first protocol that is different from a second protocol included in the second task definition.

13. The one or more non-transitory computer readable media of claim 8, wherein granting a second workspace access to the service runner comprises:

receiving an access request to the service runner associated with the second workspace; and receiving, in response to the access request, a granting request, wherein the second workspace is granted access to the service runner in response to the granting request.

14. A system, comprising:

one or more memories; and one or more processors, the one or more processors configured to execute instructions stored in the one or more memories to:

deploy a service runner to a utility node within an infrastructure, wherein the service runner is created in an event management bus (EMB) within a first workspace that includes a first automation task, wherein the utility node is configured to communicate with the EMB;

grant, a second workspace, access to the service runner, wherein the second workspace includes a second automation task, and wherein the access enables execution of the second automation task by the service runner;

receive a request associated with a workspace to execute an automation task on a target node; and configure the service runner to execute the automation task responsive to a first determination comprising that the automation task is the first automation task and that the workspace is the first workspace or a second determination comprising that the automation task is the second automation task and that the workspace is the second workspace.

15. The system of claim 14, wherein, to receive the request associated with the workspace comprises to receive a task definition, the task definition comprising:

the target node;

a command to execute on the target node;

a protocol associated with the command; and a credential indicator, wherein the credential indicator is one of, a credential, a credential identifier, or none.

16. The system of claim 15, wherein the service runner obtains a credential for executing the automation task from a credential vault deployed within the infrastructure based on a credential identifier.

17. The system of claim 15, wherein, to configure the service runner to execute the automation task, the one or more processors configured to execute instructions stored in the one or more memories to:

add the task definition associated with the automation task to a task queue that the service runner periodically queries.

18. The system of claim 15, wherein the task definition identifies the utility node as the target node and the service runner executes the command on the utility node.

19. The system of claim 15, wherein the task definition is a first task definition when the task definition is associated with the first automation task and a second task definition when the task definition is associated with the second automation task, wherein the first task definition includes the target node and the second task definition includes the target node; and wherein the first task definition includes a first protocol that is different from a second protocol included in the second task definition.

20. The system of claim 14, wherein, to grant a second workspace access to the service runner, the one or more processors configured to execute instructions store in the one or more memories to:

receive an access request to the service runner associated with the second workspace; and receive, in response to the access request, a granting request, wherein the second workspace is granted access to the service runner in response to the granting request.

* * * * *